United States Patent [19]
Citron et al.

[11] Patent Number: 5,288,976
[45] Date of Patent: Feb. 22, 1994

[54] BAR CODE USE IN INFORMATION, TRANSACTIONAL AND OTHER SYSTEM AND SERVICE APPLICATIONS

[75] Inventors: Howard Citron, Katonah, N.Y.; Robert Springer, Wyckoff, N.J.

[73] Assignee: Nynex Corporation, New York, N.Y.

[21] Appl. No.: 729,648

[22] Filed: Jul. 15, 1991

[51] Int. Cl.$^5$ .................. G06F 15/20; G06K 19/06
[52] U.S. Cl. .................. 235/375; 235/462; 235/494; 379/102
[58] Field of Search .................. 235/375, 462, 494; 340/825.1, 825.29, 825.35; 379/102, 105, 93

[56] References Cited

U.S. PATENT DOCUMENTS

| | | | |
|---|---|---|---|
| 4,475,153 | 10/1984 | Kihara et al. | 364/143 |
| 4,535,204 | 8/1985 | Hughes et al. | 235/472 |
| 4,654,482 | 3/1987 | DeAngelis | 379/95 |
| 4,816,635 | 3/1989 | Edamura | 235/375 |
| 4,831,610 | 5/1989 | Hoda et al. | 235/462 |
| 4,841,132 | 6/1989 | Kajitani et al. | 235/375 |
| 4,882,475 | 11/1989 | Miller et al. | 235/383 |
| 4,899,370 | 2/1990 | Kameo et al. | 235/375 |
| 4,937,853 | 6/1990 | Brule et al. | 379/96 |
| 4,947,028 | 8/1990 | Gorog | 235/381 |
| 4,952,785 | 8/1990 | Kikuda | 235/462 |
| 4,964,167 | 10/1990 | Kunizawa et al. | 381/52 |

FOREIGN PATENT DOCUMENTS

| | | | |
|---|---|---|---|
| 0299445 | 12/1988 | Japan | 379/102 |
| 0143552 | 6/1989 | Japan | 379/102 |
| 0158865 | 6/1989 | Japan | 235/462 |
| 2202664 | 9/1988 | United Kingdom | 235/462 |

OTHER PUBLICATIONS

"Bar Code Technology Helping To Fight Crime" by Jon Van, published in the Orlando Sentinel, May 26, 1991, pp. D-1-D-12.
The Bar Code Book, Roger, C. Palmer, Helmers Publishing Inc. 1989, pp. 24-25.
Handbook of Bar Coding System, Harry E. Burke, 51-2 Van Norstrand Reinhold Company, 1984, p. 54.
Technology Review MIT, Under The Domes, The Best Invention of 1991, Aug.-Sep. 1991.
Electronic Design, Button ID Tags, Jul. 25, 1991, pp. 155-156.

Primary Examiner—Donald Hajec
Assistant Examiner—Esther Chin
Attorney, Agent, or Firm—Loren Swingle; John J. Torrente

[57] ABSTRACT

A system which utilizes a bar code having an instruction field whose data specifies an action to be performed and also having a reference field whose data relates to the data in the instruction field. The system reads the instruction and reference fields of the bar code and processess the read data. This processing may determine from the instruction field data that the action or actions to be taken are to be taken on data other than that in the reference field of the bar code. It also may determine from the data in the instruction field that an action to be taken on the data in the reference field is other than an action identified in the instruction field of the bar code. Based on these determinations, the system continues the processing using the appropriate action and data.

A unique bar is also used in the system. This bar code, between its start and stop fields, has a separator field whose width is greater than that of any of the individual bar code characters.

38 Claims, 5 Drawing Sheets

| | 2A | 2B | 2C | 2D | 2E |
|---|---|---|---|---|---|
| | START FIELD | INSTRUCTION FIELD | REFERENCE FIELD | CHECK SUM FIELD | STOP FIELD |

FIG. 3

| ACTION | INSTRUCTION FIELD CODES | DTMF TONES |
|---|---|---|
| PLAY MESSAGE | $CODE_1$ | $DTMF_1$ |
| RECORD MESSAGE | $CODE_2$ | $DTMF_2$ |
| STOP / START MESSAGE | $CODE_3$ | $DTMF_3$ |
| APPEND MESSAGE | $CODE_4$ | $DTMF_4$ |
| ERASE MESSAGE | $CODE_5$ | $DTMF_5$ |
| RECORD IF EMPTY OR PLAY | $CODE_6$ | $DTMF_6$ |
| $FUNC_1$ | $CODE_7$ | $DTMF_7$ |
| $FUNC_2$ | $CODE_8$ | $DTMF_8$ |
| ⋮ | ⋮ | ⋮ |
| $FUNC_n$ | $CODE_{n+8}$ | $DTMF_{n+8}$ |
| $COM_1$ | $CODE_{n+9}$ | $DTMF_{n+9}$ |
| $COM_2$ | $CODE_{n+10}$ | $DTMF_{n+10}$ |
| ⋮ | ⋮ | ⋮ |
| $COM_m$ | $CODE_{m+n+9}$ | $DTMF_{n+m+10}$ |

BAR CODE USE IN INFORMATION, TRANSACTIONAL AND OTHER SYSTEM AND SERVICE APPLICATIONS

BACKGROUND OF THE INVENTION

This invention relates to information, transactional and other like system and service applications and, in particular, to system and service applications in which bar codes are used.

There are a variety of systems in use today in which bar codes serve as a way of inputting identification information to the system. Thus, for example, in store checkout systems, bar codes placed on the products being sold are scanned to identify the products. This identification information is then passed to a host processor which determines the prices of the scanned products and reports them to an electronic cash register at the store check out.

Another type of system in which bar codes are used for identification purposes is the lottery communication system disclosed in U.S. Pat. No. 4,937,853. In the system of this patent, bar codes are used to identify lottery ticket numbers, invoices numbers, telephone numbers and the like in connection with services provided to a lottery agent. The identified numbers developed by the agent scanning the bar codes are communicated over an interactive telephone network which connects the agent to a host processor. The host processor provides services such as ticket validation, ordering of materials and invoice confirmation.

In the '853 system, voice prompts are provided over a telephone to the lottery agent who can respond by scanning the bar code of any needed numbers. The electrical signals which result from scanning the bar code are then converted into dual tone multi-frequency (DTMF) signals and/or dial pulse signals by execution of an application program which is accessed by a processor at the bar code reader. These signals are then transmitted over the telephone system to the host processor. When a bar code used to identify a telephone number is scanned, the telephone number is retrieved and supplied to an auto dialer which dials the number in DTMF tones or dial pulses.

The '853 patent further mentions that by accessing keys on a bar code interface, data such as a stored telephone number can be retrieved. The retrieved data can then converted to DTMF tones or dial pulses for transmission over the telephone network.

Another system which uses bar codes for identification purposes and for function command purposes is the home ordering system disclosed in U.S. Pat. No. 4,654,482. In this system, orders can be placed from the home over the direct dial telephone network. The orders are placed from printed materials such as catalogues, newspaper inserts or the like advertising materials which carry an item identification bar code adjacent the description of each item. This bar code when scanned is fed to a processing device at the user's location. The user's processing device stores the identification data contained in the scanned bar code along with transactional information of the corresponding merchant.

The user's processing device in the U.S. Pat. No. 4,654,482 system is operated by the user depressing switches to invoke desired actions (e.g., send, select) or to provide desired responses (e.g., yes, no, etc.) in response to prompts on a display. These prompts are generated at the user's processing device based on signals developed locally at the device or based on signals developed at a merchant's host processor. The latter processor communicates with the user's processing device over the direct dial telephone network via a modem. The user's processing device responds to the button actuation by performing certain activities associated therewith. The U.S. Pat. No. 4,654,482 also states that the switches of the user's processing device may be replaced by a plurality of bar code indicia such that each set or group of such indicia corresponds to a function to be enabled by the replaced switch.

In order to make purchases from different merchants using the U.S. Pat. No. 4,654,482 system, cartridges storing transactional information of the different merchants are provided. As an alternative to using different storage cartridges, the patent states that a fixed memory containing all the data for the different merchants can be used. In this case, one or more bar codes can serve to identify the different merchants and, if desired, to provide data associated with the merchants.

A further system which utilizes bar codes for identifying and extracting data is disclosed in U.S. Pat. No. 4,882,475. In the system of this patent, information associated with a food order is stored based upon an order identification number. The latter number is then placed on an order label via encoding the number on a bar code. By then scanning the bar code, the order number is retrieved and the stored information associated with the order number can then be read out. The patent teaches that this information can be read out verbally or electronically into a hand held data unit.

Bar codes are also used in the synthesized voice generating system disclosed in U.S. Pat. No. 4,964,167. In this system, a bar code carries phonetic information, rhythm information and particular processing information associated with a word which is to be verbally reproduced. By scanning the bar code, this information can be retrieved and used to reproduce the word. The patent teaches developing learning devices in the form of books in which bar codes are placed adjacent words whose pronunciation is to be learned.

While all of the above systems teach the use of bar codes in informational and transactional types of service applications and systems, individual bar codes have been used in these systems for either article identification purposes or function identification purposes. This limited use of the bar codes has limited the versatility of the systems.

It is, therefore, an object of the present invention to provide bar codes and an associated system in which a bar code can serve more than a single purpose.

SUMMARY OF THE INVENTION

In accordance with the principles of the present invention, the above and other objectives are realized in a system in which bar codes are used which have at least a first (instruction) field and at least a second (reference) field. The instruction field of each bar contains data or information concerning or related to action to be taken and the reference field contains data or information related to the data in the instruction field.

The data in the instruction field may specify a particular action or identify a set of actions to be taken. The data in the reference field may identify what the specified action or actions are to be taken on. The instruction field data may also indicate that an action is to be taken on what is identified in the reference field of another bar code. In such case, the data in the reference field will provide a predetermined indication such as, one or more preselected characters, a null or an empty condition, indicating or confirming that the action is to be taken based on data to be obtained from the reference field of another bar code. If the other bar code is one to be subsequently scanned, the action specified in the subsequently scanned bar code will be disregarded in favor of the action specified the first bar code.

The data in the instruction field may also a provide a predetermined indication such as one or more preselected characters, a null or an empty condition, indicating that an action to be taken on the data in the reference field is an action identified in another bar code. In such case, subsequent scanning of the other bar code will result in the action specified in the subsequent bar code being performed on what is identified by the data in reference field of the first bar code.

In accord with the invention, the action in the instruction field may be a command to perform a function, such as play, related to a message, such as a voice message. In such case, the reference field may identify a storage location where the message is to be retrieved from or stored.

The system of the invention utilizes uniquely identified bar code readers each of which is connected to a centralized application processor. In the illustrative case to be disclosed hereinafter, each reader includes an interface for connecting the reader and an associated telephone to a telephone network. The telephone network, in turn, provides access to the centralized application processor which is adapted to interact with and interpret the instruction and reference fields of read bar codes and to provide one or more services to the users of the system.

Upon scanning of a bar code by the bar code reader, the data in the instruction and reference fields of the scanned bar code is retrieved and separated. If the instruction field data indicates a dial action, the reader will dial the number indicated by the data in the reference field. If the instruction field data indicates other than a dial action, the separated data is then transmitted by the bar code reader over the telephone network, as DTMF tones or other signals, to the application processor. The application processor then interprets the received data and reacts accordingly. If the instruction field of a bar code specifies an action and the reference field identifies data to be acted on, the application processor causes the specified action to be performed using the related identified data. On the other hand, if either field is empty or a null, the application processor will look to the needed data elsewhere as, for example, in a field of a previously or subsequently scanned bar code, to cause on action to be performed. The application processor can be further adapted such that a different number of scans over the same bar code will be interpreted as requiring different actions to be performed.

In yet a further aspect of the invention, the bar codes of the invention are adapted to be organized so as to be visibly distinguishable from standard bar codes. In accordance with invention, this adaption takes the form of a pronounced separator field situated between the start and stop fields of the bar code and comprised of a region whose width is greater than the width of any of the individual bar code characters or elements.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
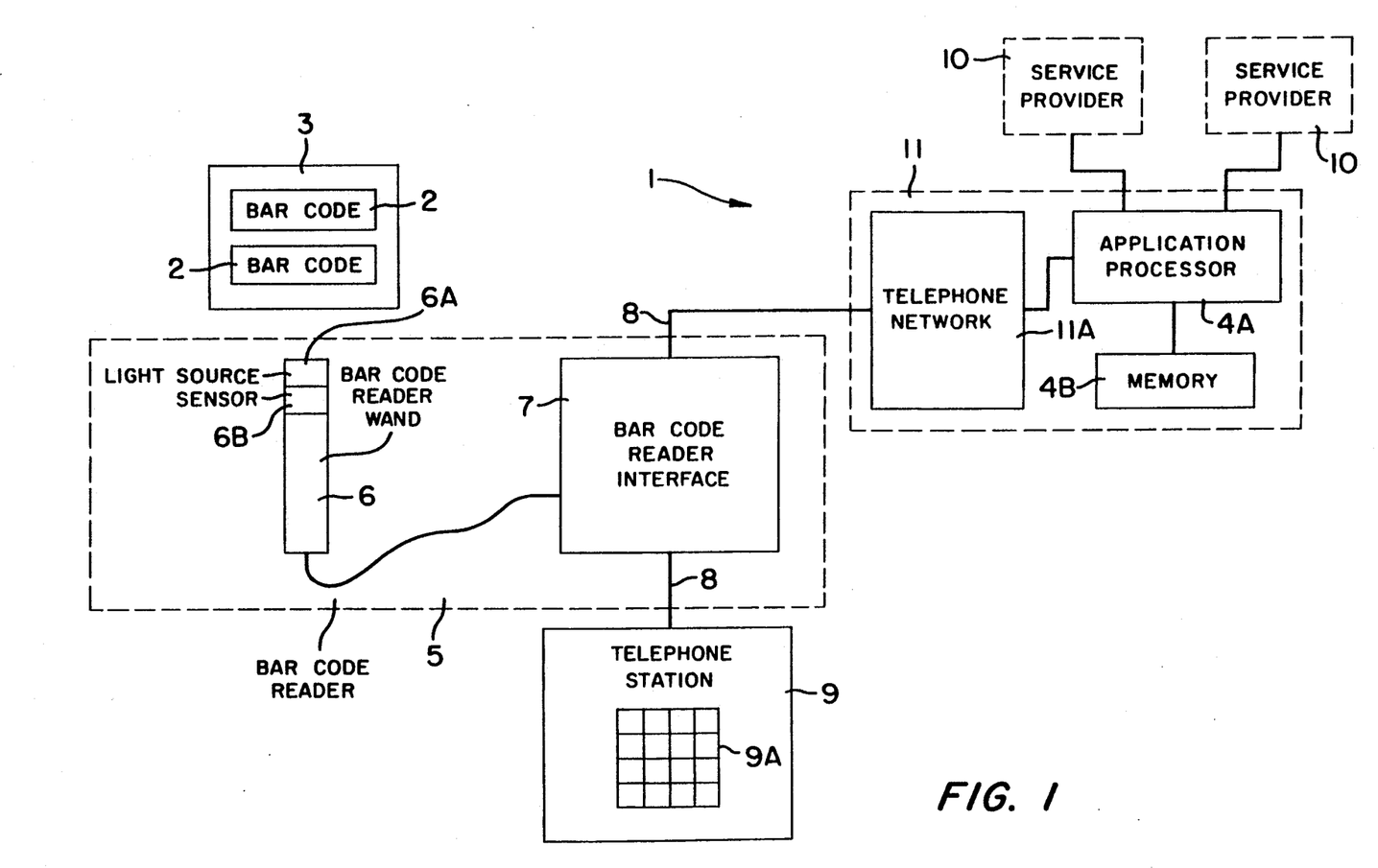
FIG. 1 shows a system and bar codes in accordance with the principles of the present invention.

FIG. 1 shows a system 1 using bar codes 2 configured in accordance with the principles of the present invention. Each bar code 2 is carried on an article 3 whose nature will depend upon the nature of the services to be provided by the system. As shown, these services are effected by a centralized application processor 4A having a memory 4B.

The application processor 4A may be part of a telephone system 11 which provides the application processor 4A as a feature of the system. In particular, the application processor enables subscribers to access the services of one or more service providers 10 whose service information is included and supplied to the application processor. The application processor might also be included as part of individual service providers, instead of as a centralized unit.

In the present illustrative case of a centralized unit, the application processor 4A may provide any number of information, transactional or other services. For example, the application processor may provide advertisement and ordering services, voice mail services, tracking and other services. These services may be interactive, i.e., require responses by the user of the system.

In the case of product advertising and order services, the article 3 might be a sales brochure, a catalogue, a newspaper, the yellow pages or like publications. In the case of voice mail services, the article 3 might be a simple sheet of paper with identification titles for reading voice messages into and out of the memory 4B of the application processor.

A bar code reader 5 is provided for reading the information or data contained in the bar codes 2. The reader 5, in the case shown, is identifiable in the system 1 by a unique identification number or ID. This ID is assigned to the reader in an initialization procedure during which the reader is granted access to the system. In this procedure, data associated with the user of the reader is stored in the memory 4B of the application processor 4A along with the reader ID. This data might include, the user's name, address, phone number, credit card number, calling card number, a language preference and a personal identification number (PIN) to be used for security purposes.

As shown, the reader 5 comprises a wand 6 which contains a light source 6A and a sensor 6B for scanning and sensing each bar code 2. The reader 5 also comprises an interface unit 7 which analyzes the sensed bar code signals read by the wand 6.

The interface unit 7 is connected to a telephone line 8 to which is also connected a telephone station 9. The station 9 is shown as a tone type telephone having a tone keypad 9A for developing DTMF tones associated with specific keys actuated on the pad.

The interface unit 7 can be connected serially with or bridged across the telephone line 8 with the station 9. In the case shown, the station 9 and interface 7 are series connected so that voice and tone signals from the station are coupled through the interface to the line 8. The line 8, in turn, couples the signals to a telephone network 11A of the telephone system 11 to which the application processor 4A is also connected.

Figure 2:
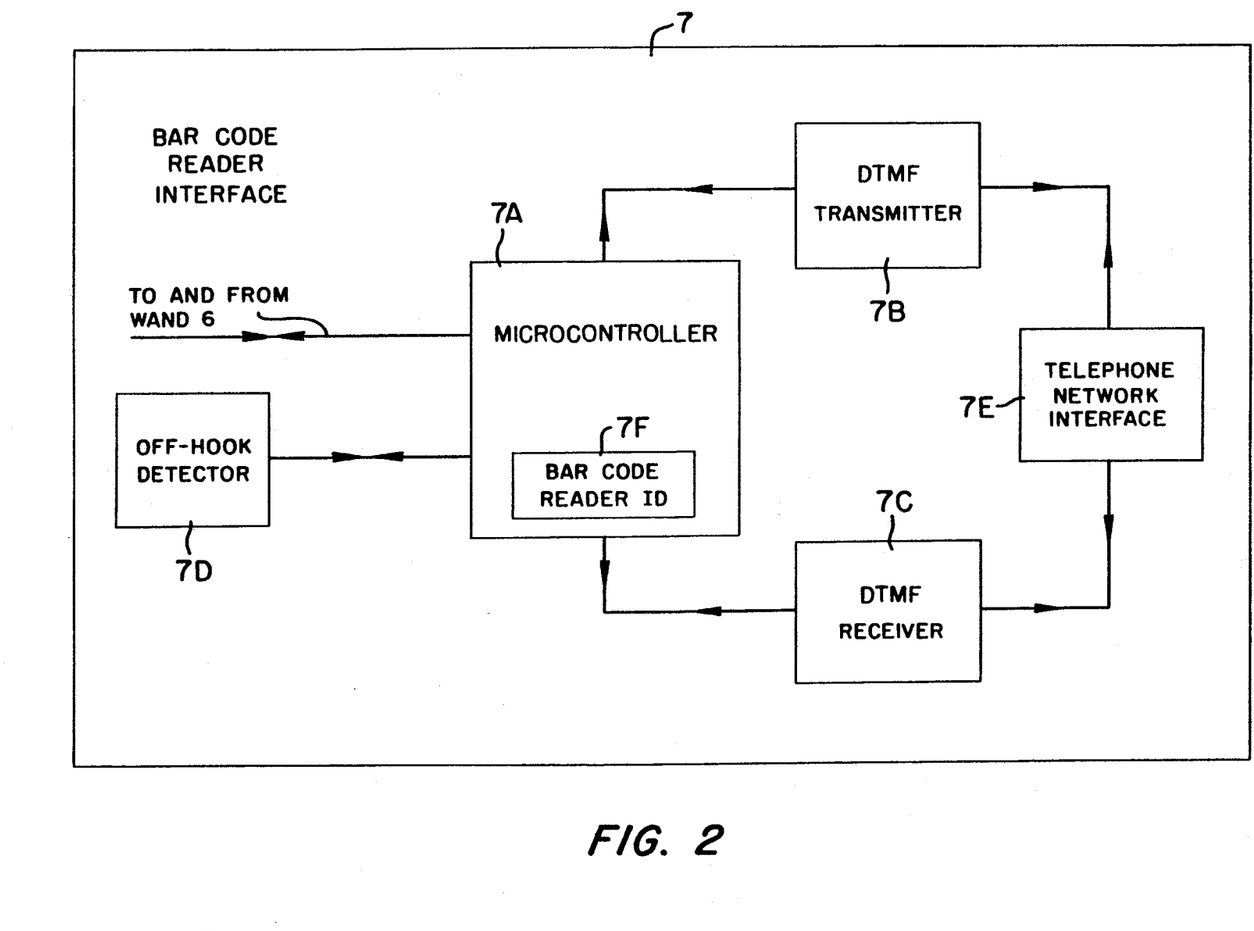
FIG. 2 shows a block diagram of the bar code reader of the system of FIG. 1.

As shown in FIG. 2, the interface 7 also includes a microcontroller 7A which controls operation of the interface through interaction with a DTMF transmitter 7B, a DTMF receiver 7C, the wand 6, an off-hook detector 7D and a telephone network interface 7E. More particularly, the microcontroller 7A monitors the off-hook condition of the telephone station 9 via the detector 7D and, when an off-hook status is detected, is able to accept signals from the wand 6. It should be noted that, if desired, the microcontroller itself can count the time between communications to determine an off-hook condition. In such case, the detector 7D need not be employed.

Once an off-hook condition is detected, if the wand 6 is now scanned over a bar code 2, the light from the light source 6A reflected from the bar code 2 is received by the sensor 6B of the wand. The sensor 6B then generates electrical signals indicative of the reflected light and thus the data carried by the bar code. These electrical signals are delivered to the microcontroller 7A. The microcontroller then separates the data in the bar code signals and analyzes the separated data.

Unless the data indicates otherwise, the microcontroller 7A will then dial the telephone number of the application processor 4B by causing the DTMF transmitter 7B to transmit to the telephone network interface 7E the DTMF tones associated with the application processor's telephone number. Thus, the interface upon scanning of the bar code 2 acts initially as an auto-dialer for the off-hook telephone station by dialing the application processor.

Upon the application processor 4A answering the call, the telephone station 9 and interface 7 will be connected over a voice path through the line 8 and telephone network 11A to the application processor. To verify this connection, the application processor can echo in DTMF tones a connection code which is received at the interface 7 by the network interface 7E and DTMF receiver 7C for verification at the microcontroller 7A.

Having established connection to the application processor 4A, the microcontroller 7A then transmits the reader ID stored in the memory 7F of the microcontroller, via DTMF tones, which are received at the application processor. The application processor then, using the received reader ID tones, verifies that the reader is a valid reader of the system. This is reported to the reader 5 by the application processor 4A echoing a verification code to the reader.

The reader 5, thereupon, causes the separated bar code data to be transmitted to the application processor 4A also via DTMF tones generated by the DTMF tone transmitter 7B. The application processor 4A, after checking and confirming parity of the data, acknowledges valid receipt of the data by echoing the received tones to the reader. If parity is not confirmed, the application processor 4A may request a resend of the data.

In accordance with the principles of the present invention, the bar code data included in each of the bar codes 2 hand received by the application processor 4A contains information regarding an action or actions to be taken as well as related information. As a result, the versatility of the system 1 and the ability of the application processor 4A to provide services to the users of the system is greatly improved.

Figure 3:
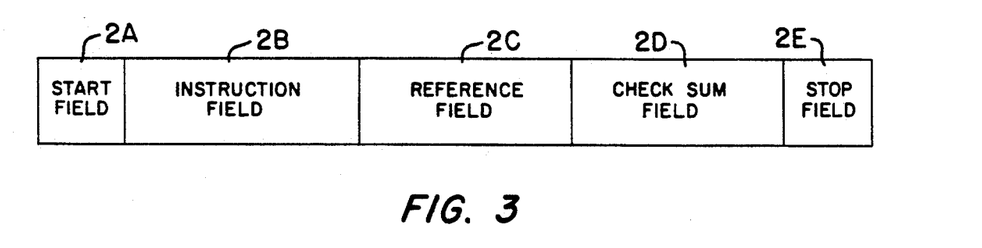
FIG. 3 illustrates in pictorial form a bar code in accordance with the principles of the present invention.

More particularly, FIG. 3 shows a pictorial representation of a bar code 2. As shown, the bar code includes a plurality of fields, illustrated, as fields 2A . . . 2E, at least one of which, i.e., the instruction field 2B, contains data or information concerning or related to an action or actions to be taken, and at least a second one of which, i.e., the reference infield 2C, contains data related to the data in the instruction field. In the present illustrative case, bar code 2 also includes a start field 2A and a stop field 2E which indicate the beginning and end of the bar code, respectively, and a checksum field 2D which is used verify the correctness of the bar code when decoded.

More particularly, the value of the checksum field 2D is determined when the bar code 2 is created usually by an algorithm performed on the characters of the code. When the code is decoded, the same algorithm is performed and the resulting value checked against the checksum field to verify the correctness of the code.

Each of the fields 2A–2E of the bar code 2 may comprise one or more bar code characters and each bar code character may comprise a sequence of reflective (white) and non-reflective (black) elongated bars or elements. Encoding of these elements can take on a number of conventional forms. Examples of these forms are "module width" encoding and "non-return-to-zero" encoding. In the former encoding, the elements can take on a wide width or a narrow width which correspond to a "0" data bit and a "1" data bit, respectively, a sequence of these wide and narrow elements, forming a given character. In the latter encoding, the reflectivity and non-reflectivity of the elements result in "0" and "1" data bit, respectively, and a width of these elements again forms a given character. Typically, each character of a bar code will correspond to a given numeric or alphanumeric character.

In the present case, the characters of the bar codes 2 preferably represent numeric characters and the encoding is preferably module width coding. A preferable form of module width encoding is Interleaved 2 of 5 Coding which has a high information density and contains two wide elements within a five element character. In this type of encoding, intercharacter spaces are eliminated by interleaving characters encoded in the bars with characters encoded in the spaces. It should be noted that the number of characters utilized in any field of each bar code 2 will depend upon the information to be carried in the field. Additionally, the size of the article 3 as well as the printing technique for the code and the quality of the article surface will dictate the overall size and, therefore, number of characters which can be used in any of the bar codes 2.

Figure 4:
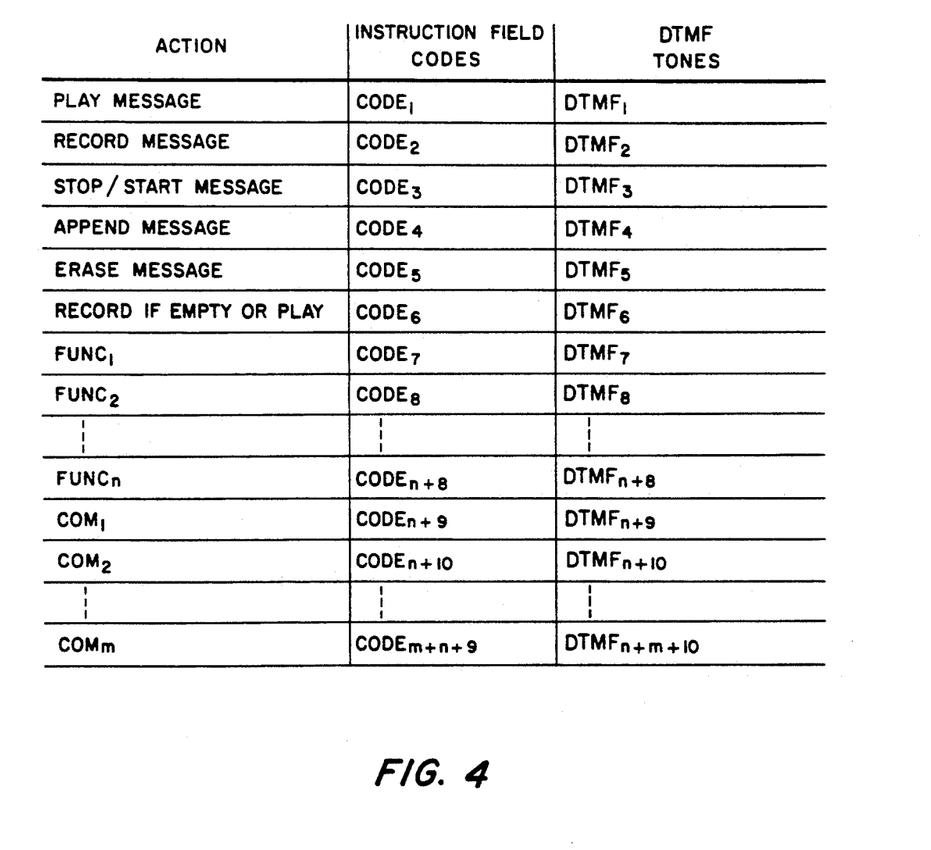
FIG. 4 shows a table of actions identifiable in the instruction field of the bar code of FIG. 3.

As above-indicated, each bar code 2 is unique in that it contains an instruction field 2B which carries data related to an action or actions to be taken and a reference field 2C which contains data related to the data in the instruction field. FIG. 4 is a table which shows respective actions able to be identified by corresponding codes, i.e., $Code_1$, $Code_2$, etc., in the instruction field of a bar code 2. In the present example, each code typically will comprise one or more numeric bar code characters.

As can be seen from the table, the first six of the actions listed are specific actions which deal with playing or reading and recording messages. In the case of these actions, the data in the reference field of the bar code will indicate or point to the location in the application processor from which the message associated with the action is to be retrieved or into which the message is to be recorded. Accordingly, when the DTMF tones, i.e., $DTMF_1$, $DTMF_2$, etc. corresponding to each of these actions and the related reference data field DTMF tones are received by the application processor 4A, the processor recognizes the tones and associated codes and performs the actions specified.

The function actions in the table, i.e., $Func_1$, $Func_2$, etc., allow for and identify more complex actions to be carried out by the application processor 4A. These actions are also identified by corresponding Codes in the instruction field and transmitted via corresponding DTMF tones.

In the present illustrative case, these complex actions are to be carried out by the application processor 4A using reference field data in a previously scanned or subsequently scanned bar code. This may be indicated by the function Code in the bar code and/or by making the reference field in the bar code contain one or more preselected characters or be a null or empty field. When the application processor 4A recognizes a function Code in the instruction field of a bar code and a null in the reference field of the bar code, the application processor then look for data identified in the reference field of a previously or subsequently scanned bar code. This is determined by the specific function Code and the programming of the application processor.

If the data to be used is that in the reference field of a subsequently scanned bar code, the application processor 4A will disregard any action specified in the instruction field of the subsequent bar code. It will, thus, not perform the action specified, but instead will use the data in the reference field of the second scanned code in carrying out the complex actions identified in the first scanned code.

The table of FIG. 4 also illustrates certain representative command actions, $Com_1$, $Com_2$, etc., which are also identified by corresponding Codes in the instruction field of a scanned bar code 2. Bar codes carrying a command action also carry one or more preselected characters or a null or empty in their respective reference field, since the command actions are general actions which do not require, specific data to be pointed to for their performance. Rather, more general data is applicable to the command actions and the application processor 4A recognizes this from the associated Codes and, if necessary, obtains any reference data from its memory 4B.

Figure 5:
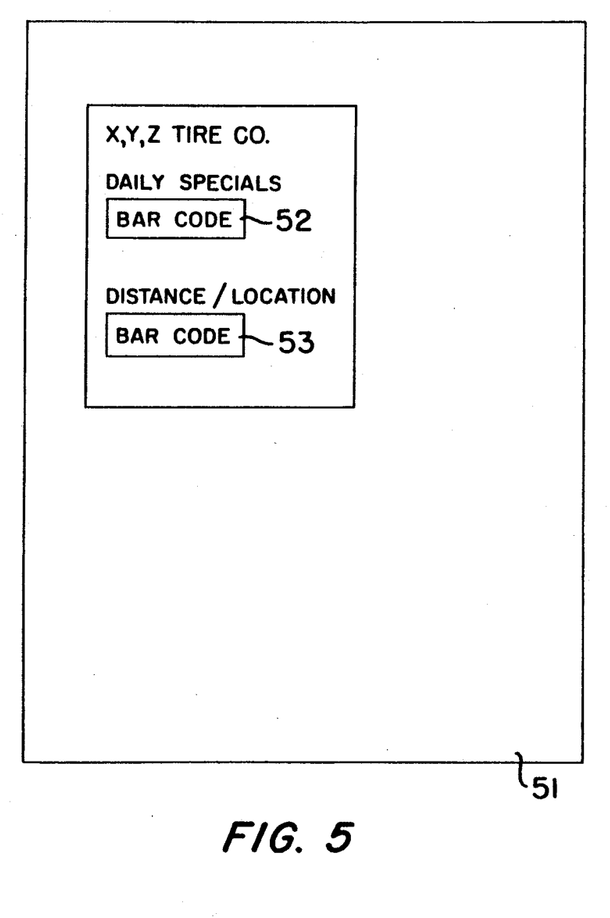
FIG. 5 shows application of the bar codes of the invention in providing an information and advertising service.

Having described representative actions which can be specified by the coded data in the instruction field of the bar codes 2 of the invention, examples of services provided by the application processor 4A in conjunction with these bar codes will now be described. FIG. 5 illustrates one such service in which the application processor 4A provides advertisement information to a user based on a yellow page advertisement 51.

As shown, the advertisement 51 is for the XYZ Tire Co. which sells automobile tires. A bar code 52 in accord with the invention is included in the ad to enable a user to access daily special information. The bar code 52 will thus contain the code Code 1 in its instruction field indicative of the action to play a message and will contain data in its reference field identifying the location in the memory 4B of the application processor 4A which contains the daily special information for the XYZ Co.

When the bar code 52 is thus scanned by the wand 6 of the bar code reader 5, the reader interface 7 accepts the bar code data from the wand, separates the data in the bar code fields and establishes a communications path through the telephone network 11A to the application processor 4A as above-discussed. The interface then transmits the separated data fields to the application processor via the corresponding DTMF tones.

When the application processor 4A receives these tones, it recognizes that the instruction field tone identifies the action to play a message and that the reference field tones identify the memory location of the daily special message of the XYZ Co. The application processor 4A will therefore cause the daily special message to be played from the identified memory location and to be transmitted to the user at the reader interface 7 who can listen to the message over the telephone station 9.

After the daily special message is played to the user the user can then terminate the connection to the application processor by placing the telephone station 9 on-hook. More particularly, this on-hook condition is recognized by the network 11 so that the voice path to the application processor is terminated. Also, the on-hook condition is detected at the off-hook detector 7D of the interface 7 and this is reported to the microcontroller 7A which then terminates acceptance of data from the wand 6.

However, if the user desires to receive further information regarding the advertiser, XYZ Co., the user can now scan a further bar code 53 which is also included in the ad and, in the case shown, identifies distance/location information of the advertiser. When this bar code is scanned, the interface 7 again receives the data in the fields of the bar code and separates the data. Since the microcontroller 7A in this case recognizes that there is an existing off-hook telephone condition and, therefore, that there is already in place a communication path to the application processor 4A, the microcontroller does not perform the auto-dial function. Instead, the microcontroller proceeds by causing the transmission of the bar code data via the appropriate DTMF tones.

Unlike the play action in the bar code 52, the distance/location action in the bar code 53 is a complex action requiring the distance from the user's location to the advertiser's location to be first determined. The instruction field of the bar code 53 thus contains the Code identifying the the distance/location function, while the reference field of the bar code 53 will contain a null or void.

Accordingly, upon the data fields of the bar code 53 being received at the application processor 4A, the processor 4A recognizes from the instruction field data that the distance/location function is to be performed and from the null in the reference field that the data for performing the function is identified in the reference field of another bar code. The processor 4A will then look to an immediately preceding or succeeding scanned bar code for the reference field data.

In the present case, the bar code 52 was scanned immediately preceding the bar code 53, so the processor 4A will use the data identified by the reference field in the bar code 52 to carry out the function. This data contains the identification location for the advertiser. The application processor 4A using this location information and information concerning the location of the user obtained from the stored information in the memory 4B under the reader ID, then performs the distance calculation. After the calculation is made, the application processor 4A transmits the distance information to the reader interface 7 which couples it to telephone station 9 where it can be heard by the user. The distance information may also be accompanied by a statement indicating to the user that if the location of the advertiser is also desired, the user need only scan the bar code 53 again to obtain this information.

Upon the user scanning the bar code 53 again, the coded data in the instruction field of the bar code when received by the program will now be understood by the application processor 4A as requiring a location determination. The program will, therefore, determine the location of the advertiser in relation to the user again using the advertiser data identified by the reference field of the previously scanned bar code 52 and the user information identified by the reader ID. The location information will then be transmitted by the application processor 4A to the user as a voice message over the network 11A and telephone station 9 to complete the action.

Figure 6:
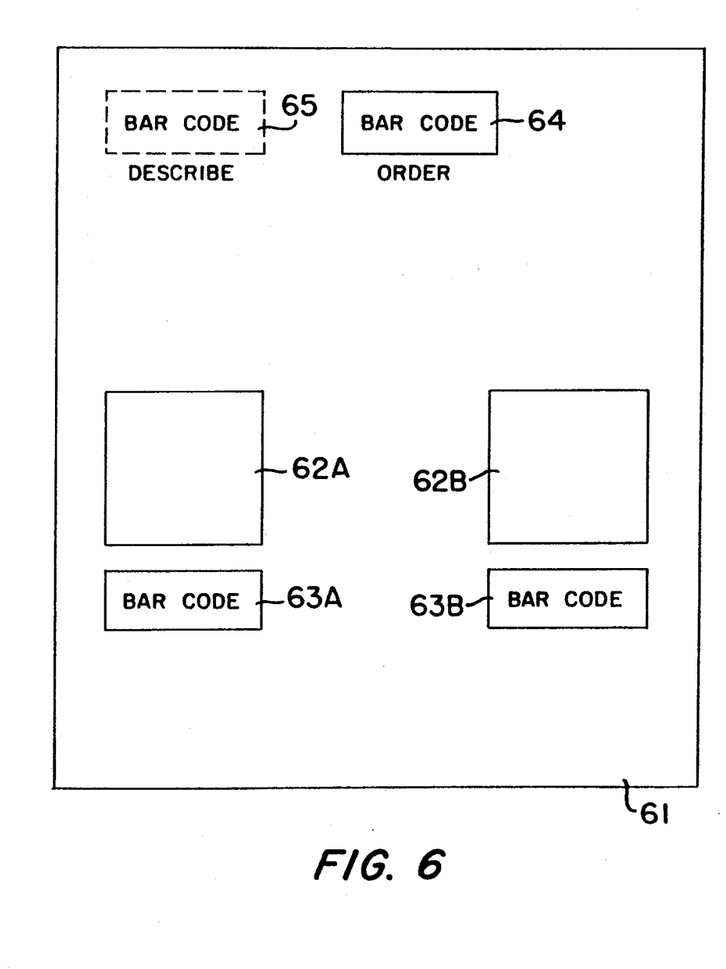
FIG. 6 shows application of the bar codes of the invention in providing an information and ordering service for products.

FIG. 6 shows an example of the application of the bar codes and system of the invention to a catalogue ordering service provided by the application processor 4A. In this case, a catalogue 61 contains an advertisement showing products 62A and 62B being offered for sale. Bar codes 63A and 63B, are adjacent the respective products and a further bar code 64, labelled ORDER, is also situated on the catalogue page.

Each of the bar codes 63A, 63B and 64 is a bar code in accordance with the invention. More particularly, the bar codes 63A and 63B are codes which define a play message action with respect to their adjacent products, while the bar code 64 defines a more complex order function. The bar code 64 will thus have a null in its reference field and, if scanned, will require reference field data from one of the other bar codes 63A or 63B If a bar code adjacent a particular one of the products 62A and 62B is scanned by the wand 6, the interface 7 will again dial the application processor 4A to establish a voice path thereto through the network 11A. The bar code instruction and reference fields will contain, respectively, the play message $Code_1$ and data identifying the location of the message to be played.

Upon the application processor 4A receiving the data in these fields, the processor will retrieve the message identified by the data and play the message so it is heard by the user. The message may, for example, describe certain details regarding the product and request the user to scan the bar code 64 if the user wishes to order the product.

If the bar code 64 is now scanned, the application processor will then proceed to perform the order function. In this case, the program will use data identified by the reference field of the first bar code scanned, either bar code 63A or 63B, and the stored information identified by the user ID to complete the steps required to order the product for the user.

Figure 7:
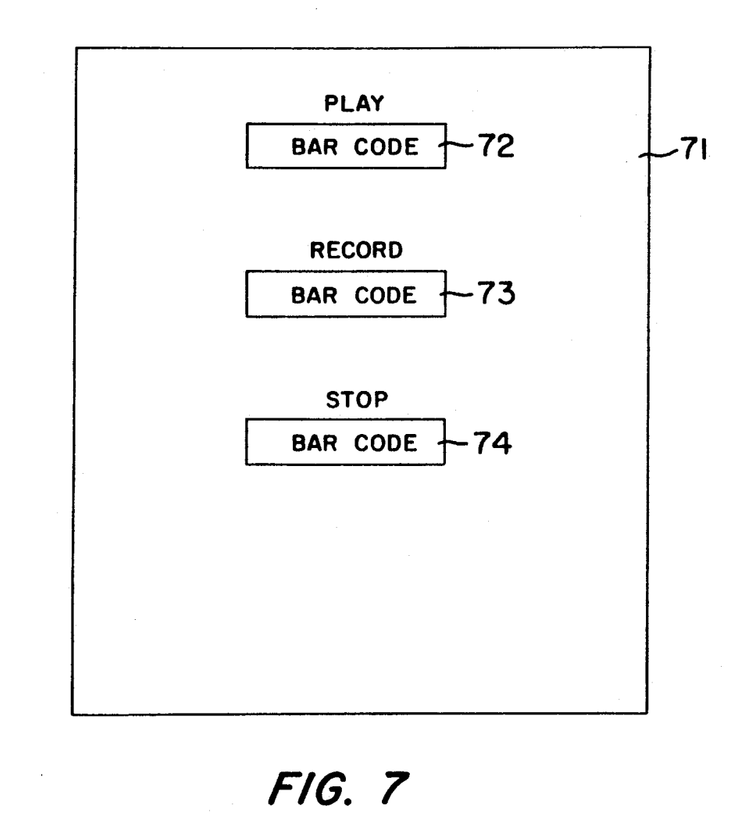
FIG. 7 illustrates application of the bar codes of the invention in performing a voice message service.

FIG. 7 shows another application of the bar codes and system of the invention. In this case, the bar codes and system are adapted for use in providing a voice message service. In particular, a voice note 71 is provided. The voice note 71 has bar codes 72, 73 and 74 which allow a user to play a message, record a message and stop playing a message, respectively.

In this case, the bar codes 72-74 carry in their instruction fields $Code_1$, $Code_2$ and $Code_3$ which identify, respectively, the play, record and stop play message actions. The reference field in each bar code, in turn, contains data which identifies the specific location or locations in the memory 4B from or into which the message is to be read. By scanning the bar code 73 the application processor 4A recognizes from the instruction and reference field data that a message is to be recorded at a given location in the memory. The user then recites the message at the telephone station and the message is recorded.

If an already stored message is to be played by the user, the user scans the bar code 72. As a result, the application processor 4A recognizes from the bar code data in the instruction and reference fields that a message is to be played from the memory location identified in the reference field. The application processor then retrieves the message and plays it to the user. If the user desires playing of the message to be terminated before the end of the message, the user can then scan the stop play bar code 74 and the data in this bar code will cause the application processor to stop playing the message.

When using the voice note 71, a first user can record a message to be sent to a second user using the above procedure. The first user can then transmit the voice note to the second user who can then play the message, as above-described to determine its content. The second user can also record a response message on the note and transmit it to the first user.

It should be noted that while the description of the operation of the system 1 in conjunction with the services described in FIGS. 5-6 describes scanning of the function bar codes 53 and 64 after the bar codes 52 and 63A or 53B have been scanned, the system can also operate by scanning the function bar codes first. In such case, the application processor would wait for the other bar code to be scanned, i.e., 52, 63A or 63B, to identify the location of the data for performing the functions in the first scanned code. The processor would then perform these functions using this data and disregard the instruction, if any, specified in the second scanned code.

It should be also noted that the bar codes and system of the invention have been discussed above in terms of a centralized application processor 4A. However, the system could also function with an application processor at each of the service providers 10 connected to the system with or without a centralized processor. In such case, the bar codes 2 of the invention could be modified to include a telephone number field to identify the application processors at the individual service providers.

With such a modification, the microcontroller 7A of the interface could contain a look-up table correlating the telephone numbers of the different application processors of the service providers with corresponding bar code characters to be carried in the telephone fields of the bar codes. When a particular character is then found in the telephone field of a bar code, the look-up table of the interface will then provide the associated telephone number to be dialed by the interface. If no telephone field character is present and there is a centralized application processor, the interface will then dial the centralized processor.

The bar codes of the invention might also be such as to have an instruction field which is a null or empty and a reference field which contains data. In this case, the application processor can be designed to act on the data specified in the reference field of the bar code based on an action specified in a subsequently or previously scanned bar code. This type of operation could, for example, be implemented in the catalogue ordering service described in connection with FIG. 6.

In particular, the bar codes 63A and 63B could be modified so that their instruction fields contained a null, and a further instruction code 65, shown in dotted line and entitled DESCRIBE, could be added to provide the play message action. In this case, the reference field of the bar code 65 could be a null field also, indicating the action specified is to be carried out based on data in another bar code.

With the FIG. 6 bar codes modified as above, scanning the bar code 63A would provide the application processor 4A with a reference field identifying the data to be acted on and subsequent scanning of the bar code 65 would define the action to be taken on this data. In the present case, scanning the two bar codes would result in playing the message in the identified memory location.

The bar code 2 of the invention can also be utilized as a dialer by using the instruction field data to specify a dial action and the reference field data to identify the number to be dialed. In this case when the reader 5 reads the bar code and separates the characters, it will recognize the dial function. It will then dial the number identified in the reference field, instead of dialing the application processor 4A as above-described.

Figure 8:
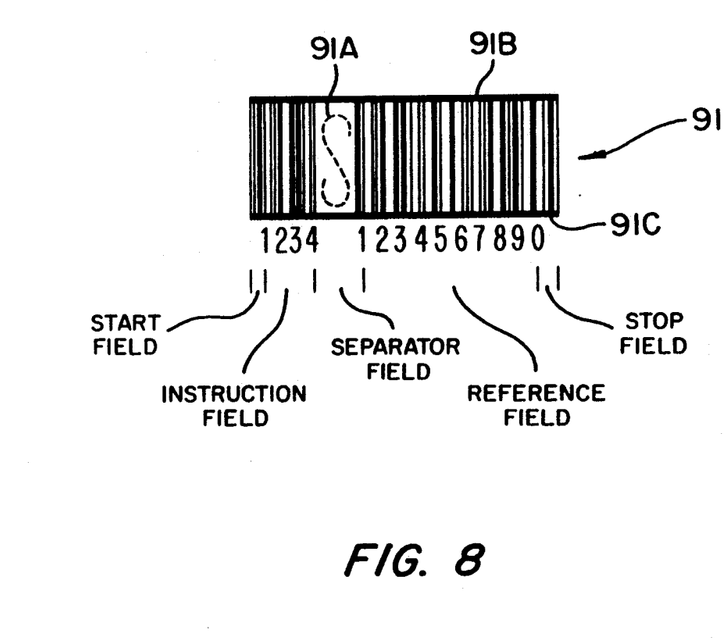
FIG. 8 shows a unique bar code configuration for the bar codes of the invention.

In a further aspect of the invention, FIG. 8 illustrates a specific bar code configuration usable with the invention and provided with visible indicia which distinguish the bar code from standard bar codes in use today. More particularly, the bar code 91 is provided with a reflective (white) or non-reflective (black) element 91A having a preselected width which makes it visibly distinguishable from the other reflective and non-reflective elements in the code.

In the present case, the element 91A is shown as a reflective element and acts as a field separator between the instruction field elements of the bar code and the reference field elements. In a preferred construction of the bar code 91, the element 91A is from 3 to 5 times as wide as the widest bar code element.

In the case shown, the bar code 91 is also provided with non-reflective (black) bars which border the upper and lower ends of the elements of the code and extend along the code width. These borders may be from 1 to 2 times as wide as the width of the widest non-reflective element.

Use of the element 91A in the bar code 91 enables the bar code to be readily visibly distinguishable from other bar codes in present day use. As a result, users of the system 1 are prevented from accidentally scanning more standard bar codes which would result in an error message being generated by the system 1.

With use of the bar code 91, the microcontroller 7A of reader 5 would be adapted to recognize the element 91A and the borders 91B, 91C to verify that a proper bar code had been read. If these were not detected, the reader 5 would provide an error message indicating an invalid bar code.

The element 91A may also be provided with a symbol to further visibly highlight its presence. The symbol could be a letter or other mark (shown in dotted line in FIG. 8 as an S) which was printed in a manner so as not to be readable by the reader. The latter can be accomplished by making the symbol a color, such as, for example, red which the wand 6 is not able to sense.

The use of the field separator 91A also allows the number of elements or characters in the instruction and reference fields to be controlled. In the bar code 91 illustrated in FIG. 8, the instruction field has 3 characters and the reference field 9 with stop and start field characters being located at the respective beginning of the instruction field and end of the reference field, respectively.

The use of the separator field 91A is also advantageous in that it enables two separate checks to be made on the bar code by checking the number of digits between the start code and the separator field and between the separator field and end code. In this way, reliability of the bar code reader can be improved.

Also, the use of the side borders 91B,91C likewise improves reading reliability, since scanning these areas will likely result in a non-reflective element signal whose width will exceed that of the widest element in the code. This signal will indicate than an error condition has occurred as a result of scanning outside the extent of the bar code elements.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A bar code including a plurality of bar code fields, each of said fields including one or more bar code characters, a first bar code field containing data related to at least an action to be performed and a second bar code field containing data related to the data in said first bar code, said bar code characters being one of reflective and non-reflective, and said bar code having a start field at the beginning of said bar code and a stop field at the end of said bar code, and said bar code further having a separator field between said stop and start fields, said separator field including a character which is one of reflective and non-reflective and of a width which exceeds the width of any of the other bar code characters included in said bar code.

2. A bar code in accordance with claim 1 wherein:
said character of said separator field has a width which is in the range of three to five times the width of the widest of the other bar code characters included in said bar code.

3. A bar code in accordance with claim 1 wherein:
said separator field is bordered at one end by said first bar code field and at the other end by said second bar code field.

4. A bar code in accordance with claim 1 wherein:
said character of said separator field has a reflective symbol therein.

5. A bar code in accordance with claim 1 wherein:

said bar code further includes a first non-reflective element bridging the top ends of all the characters of said bar code and a second non-reflective element bridging the bottom ends of all the characters of said bar code.

6. A system comprising:
at least one bar code, each bar code including a plurality of bar code fields, each of said fields including one or more bar code characters, a first bar code field containing data related to at least an action to be performed and a second bar code field containing data related to the data in said first bar code field;
means for reading a bar code to separate the fields of said bar code;
processing means responsive to said reading means for processing the data in said first and second fields of each said read bar code;
said processing means enabling the performance of the action to which the data in said first field of a first bar code relates based on the data in the second field of said first bar code;
said data in said second bar code field of said first bar code indicating that the action to which data in said first bar code field of said first bar code relates is to be carried out based on further data which is other than said data in the second bar code field of said first bar code;
and said processing means enables the performance of the action to which the data in the first bar code field of said first bar code relates based on said further data.

7. A system in accordance with claim 6 wherein:
said indication is provided by said data in said second bar code field of said first bar code being one of a null and a preselected character or characters.

8. A system comprising:
at least one bar code, each bar code including a plurality of bar code fields, each of said fields including one or more bar code characters, a first bar code field containing data related to at least an action to be performed and a second bar code field containing data related to the data in said first bar code field;
means for reading a bar code to separate the fields of said bar code;
processing means responsive to said reading means for processing the data in said first and second fields of each said read bar code;
said processing means enabling the performance of the action to which the data in said first field of a first bar code relates based on the data in the second field of said first bar code;
said data in said first bar code field of said first bar code indicating that the data in said second bar code field of said first bar code relates to further data which is related to an action and which is in other than in said first bar code;
and said processing means enabling the performance of the action to which said further data relates based on the data in said second bar code field of said first bar code.

9. A system in accordance with claim 8 wherein:
said indication is provided by the data in said first bar code field of said first bar code being one of a null and a preselected character or characters.

10. A system comprising:
at least one bar code, each bar code including a plurality of bar code fields, each of said fields including one or more bar code characters, a first bar code field containing data related to at least an action to be performed and a second bar code field containing data related to the data in said first bar code field;
means for reading a bar code to separate the fields of said bar code;
processing means responsive to said reading means for processing the data in said first and second fields of said bar code;
said data in said first bar code field of a first bar code relating to a first action in a first reading of said first bar code and to a second action in a second reading of said first bar code;
said reading means making first and second readings of said first bar code;
and said processing means enabling the performance of said first action in response to said first reading of said first bar code and to said second action in response to said second reading of said first bar code.

11. A system comprising:
a plurality of bar codes, each bar code including a plurality of bar code fields, each of said fields including one or more bar code characters, a first bar code field containing data related to at least an action to be performed and a second bar code field containing data related to the data in said first bar code field;
means for reading a bar code to separate the fields of said bar code;
processing means responsive to said reading means for processing the data in said first and second fields of each said read bar code;
the data in the second bar code field of a first bar code indicates that the action to which the data in the first bar code field of said first bar code relates is to be carried out using the data in the second bar code field of a second of said plurality of bar codes; and
said processing means upon said first bar code and said second bar code being read enabling the performance of the action to which the data in the first field of said first bar code relates based on the data in the second bar code field of said second bar code.

12. A system in accordance with claim 11 wherein:
when said reading means reads said first bar code before reading said second bar code, said processing means fails to enable performance of the action related to the data in the first bar code field of said second bar code.

13. A system in accordance with claim 11 wherein:
the data in the first bar code field of said second bar code indicates that the data in the second bar code field of said second bar code relates to data related to an action and included the first bar code field of said first bar code.

14. A system in accordance with claim 13 wherein:
said indication by said data in the second bar code field of said first bar code is provided by said data in the second bar code field of said first bar code being one of a null and a preselected character or characters;
and said indication by said data in the first bar code field of said second bar code is provided by said data in the first bar code field of said second bar code being one of a null and a preselected character or characters.

15. A system in accordance with claim 11 wherein:
said indication by said data in the second bar code field of said first bar code is provided by said data in said second bar code field of said first bar code being one of a null and a preselected character or characters.

16. A system in accordance with claim 10 wherein:
the data in the first bar code field of a first bar code indicates that the data in the second bar code field of said first bar code relates to data related to an action and included in the first bar code field of second of said plurality of bar codes;
and said processing means upon said first bar code and said second bar code being read enables the performance of the action related to the data in the first bar code field of the second bar code based on the data in the second bar code field of the first bar code.

17. A system in accordance with claim 16 wherein:
said indication by the data in said first bar code field of said first bar code is provided by said data in the first bar code field of said first bar code being one of a null and a preselected character or characters.

18. A system comprising:
at least one bar code, each bar code including a plurality of bar code fields, each of said fields including one or more bar code characters, a first bar code field containing data related to at least an action to be performed and a second bar code field containing data related to the data in said first bar code field;
means for reading a bar code to separate the fields of said bar code;
processing means responsive to said reading means for processing the data in said first and second fields of each said read bar code;
said reading means including a unique identification code;
and said processing means before processing the bar code fields read by said reading means must receive from said reading means said unique identification code.

19. A system in accordance with claim 6, 8, 10, 11 or 18 further comprising:
a telephone network for enabling a communication path to be established between said reading means and said processing means.

20. A system in accordance with claim 19 further comprising:
a telephone station
a telephone line connecting said station and said reading means to said telephone network.

21. A system in accordance with claim 20 wherein:
said reading means couples signals indicative of the data in the fields of a read bar code to said telephone line for transmission over said communication path to said processing means.

22. A system in accordance with claim 21 wherein:
said communication path is a voice path; and said signals comprise DTMF tones.

23. A bar code including a plurality of bar code fields, each of said fields including one or more bar code characters each of which is one of reflective and non-reflective, said bar code fields including a start field at the beginning of said bar code, a stop field at the end of said bar code and a separator field between said stop and start fields, said separator field including a character which is one of reflective and non-reflective and of a width which exceeds the width of any of the other bar code characters included in said bar code.

24. A bar code in accordance with claim 23 wherein:
said character of said separator field has a width in the range of three to five time the width of the widest of the other bar code characters included in said bar code.

25. A bar code in accordance with claim 23 wherein:
said character of said separator field has a reflective symbol therein.

26. A bar code in accordance with claim 23 wherein:
said bar code further includes a first non-reflective element bridging the top ends of all the characters of said bar code and a second non-reflective element bridging the bottom ends of all the characters of said bar code.

27. A method comprising:
providing at least one bar code, each bar code including a plurality of bar code fields, each of said fields including one or more bar code characters, a first bar code field containing data related to at least an action to be performed and a second bar code field containing data related to the data in said first bar code field;
reading a bar code to separate the fields of said bar code field;
processing the data in said first and second fields of each said read bar code;
said processing including enabling the performance of the action to which the data in said first field of a first bar code relates based on the data in the second field of said first bar code;
said data in said second bar code field of said first bar code indicating that the action to which data in said first bar code field of said first bar code relates is to be carried out based on further data which is other than said data in the second bar code field of said first bar code;
and said processing enabling the performance of the action to which the data in the first bar code field of said first bar code relates based on said further data.

28. A method in accordance with claim 27 wherein:
said indication is provided by said data in said second bar code field of said first bar code being one of a null and a preselected character or characters.

29. A method comprising:
providing at least one bar code, each bar code including a plurality of bar code fields, each of said fields including one or more bar code characters, a first bar code field containing data related to at least an action to be performed and a second bar code field containing data related to the data in said first bar code field;
reading a bar code to separate the fields of said bar code field;
processing the data in said first and second fields of each said read bar code;
said data in said first bar code field of a first bar code indicating that the data in said second bar code field of said first bar code relates to further data which is related to an action and which is in other than in said first bar code;
and said processing enabling the performance of the action which said further data relates based on the data in said second bar code field of said first bar code.

30. A method in accordance with claim 29 wherein: said indication is provided by the data in said first bar code field of said first bar code being one of a null and a preselected character or characters.

31. A method comprising:
providing at least one bar code, each bar code including a plurality of bar code fields, each of said fields including one or more bar code characters, a first bar code field containing data related to at least an action to be performed and a second bar code field containing data related to the data in said first bar code field;
reading a bar code to separate the fields of said bar code field;
processing the data in said first and second fields of each said read bar code;
said data in said first bar code field of a first bar code relating to a first action in a first reading of said bar code and to a second action in a second reading of said first bar code;
said reading step including making first and second readings of said first bar code;
and said processing enabling the performance of said first action in response to said first reading of said first bar code and said second action in response to said second reading of said first bar code.

32. A method comprising:
providing at least one bar code, each bar code including a plurality of bar code fields, each of said fields including one or more bar code characters, a first bar code field containing data related to at least an action to be performed and a second bar code field containing data related to the data in said first bar code field;
reading a bar code to separate the fields of said bar code field;
processing the data in said first and second fields of each said read bar code;
the data in the second bar code field of a first bar code indicating that the action to which the data in the first bar code field of said first bar code relates is to be carried out using the data in the second bar code field of a second of said plurality of bar codes; and
said processing upon said first bar code and said second bar code being read enabling the performance of the action to which the data in the first field of said first bar code relates based on the data in the second bar code field of said second bar code.

33. A method in accordance with claim 32 wherein: when said reading step causes said first bar code to be read before said second bar code, said processing fails to enable performance of the action related to the data in the first bar code field of said second bar code.

34. A method in accordance with claim 32 wherein: the data in the first bar code field of said second bar code indicates that the data in the second bar code field of said second bar code relates to data related to an action and included the first bar code field of said first bar code.

35. A method in accordance with claim 34 wherein: said indication by said data in the second bar code field of said first bar code is provided by said data in the second bar code field of said first bar code being one of a null and a preselected character or characters;
and said indication by said data in the first bar code field of said second bar code is provided by said data in the first bar code field of said second bar code being one of a null and a preselected character or characters.

36. A method in accordance with claim 32 wherein: said indication by said data in the second bar code field of said first bar code is provided by said data in said second bar code field of said first bar code being one of a null and a preselected character or characters.

37. A method comprising:
providing a plurality of bar codes, each bar code including a plurality of bar code fields, each of said fields including one or more bar code characters, a first bar code field containing data related to at least an action to be performed and a second bar code field containing data related to the data in said first bar code field;
reading a bar code to separate the fields of said bar code field;
processing the data in said first and second fields of each said read bar code;
the data in the first bar code field of a first bar code indicating that the data in the second bar code field of said first bar code relates to data related to an action and included in the first bar code field of a second of said plurality of bar codes;
and said processing means upon said first bar code and said second bar code being read enabling the performance of the action related to the data in the first bar code field of the second bar code based on the data in the second bar code field of the first bar code.

38. The method in accordance with claim 37 wherein: said indication by the data in said first bar code field of said first bar code is provided by said data in the first bar code field of said first bar code being one of a null and a preselected character or characters.

* * * * *